Aug. 20, 1963    A. A. A. TOMATIS    3,101,081
APPARATUS FOR THE CONDITIONING OF THE AUDITORY LATERALIZATION
Filed Feb. 15, 1961    2 Sheets-Sheet 1
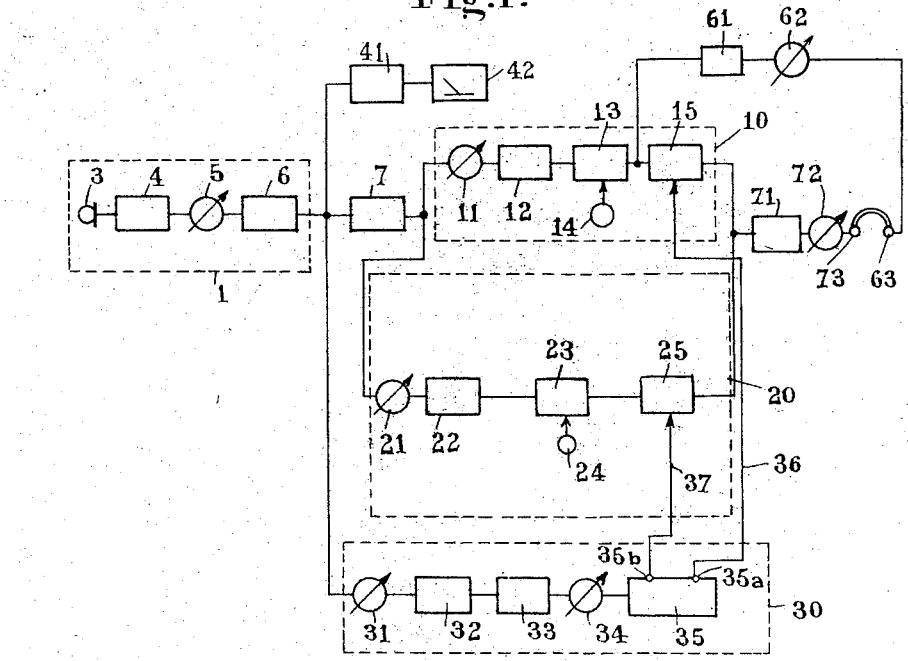
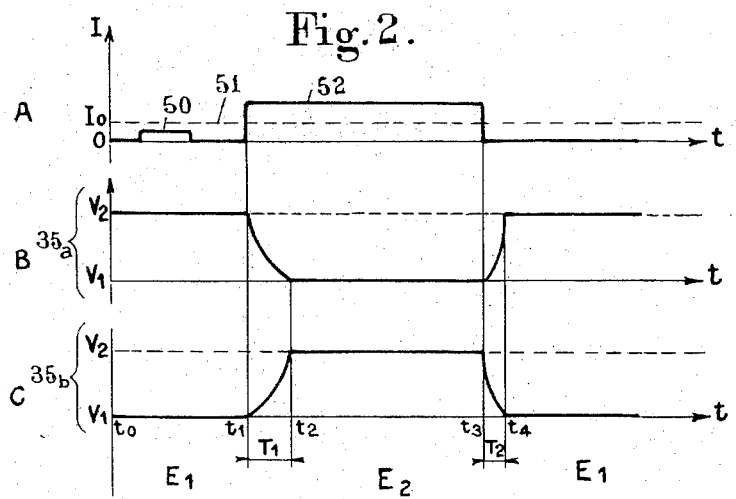
INVENTOR
ALFRED ANGE AUGUSTE TOMATIS

3,101,081
APPARATUS FOR THE CONDITIONING OF THE AUDITORY LATERALIZATION
Alfred Ange Auguste Tomatis, Paris, France, assignor to Societe Civile d'Etudes et de Brevets Mota, Paris, France
Filed Feb. 15, 1961, Ser. No. 89,484
Claims priority, application France Feb. 15, 1960
6 Claims. (Cl. 128—1)

The present invention relates to an apparatus for the conditioning of the auditory lateralization and more specifically for restoring a functionally failing directive ear where no organic lesion exists.

It is known that the human being possesses a directive ear, just as he has a directive eye. This directive ear is located at the right with a right-handed individual, and at the left with a left-handed individual. Its importance is very great since it is this directive ear which guides the sounds in the self-control of the phonation and in the information, in general.

This auditory dominance, that is, the dominance of the directive ear, is as a rule a functional dominance and in the present state of human knowledge, nothing permits of ascertaining the determination of such auditory dominance. It is a recognized fact that in human beings, there is a unilateral dominance responsive to a dominance of the cerebral hemisphere.

Any failure of the directive ear which is due only to a functional cause, not to an organic lesion, involves consequential effects on the behavior of the human being.

The absence of the directive ear—or even the mere predominance of the opposite ear—causes a disturbance in the functioning thereof and results systematically in a considerable inconvenience. In effect, it is known that the phonation of a subject depends on its auditory state and thus the failure of the directive ear may result in a disorder which may extend from the simple sputtering to the stuttering or stammering of the most serious nature. The disorders of the rhythm are thus due to a poor functioning of the directive ear.

It is therefore an object of the present invention to provide an apparatus for restoring the correct operation of a failing directive ear, not due to an organic lesion, and thus suppressing at the same time all disorders resulting from such a failure.

In no case can this apparatus restore the correct operation of an ear having undergone an organic lesion, for example, an ear having a perforated or broken tympan. On the other hand, it is suitable for imposing to the internal ear of a subject, when the directive ear is failing, a training adapted to restore the normal conditions of operation of this ear and to eliminate consequently all troubles, notably the phonation troubles arising therefrom.

As already set forth in the preamble of the specification, the causes of the dominance of the directive ear as well as those involving a failure of the directive ear are unknown. Experience teaches that the failure of the directive ear could be attended by a number of disorders in an individual without permitting an accurate detection of the causes of this failure. In any case, it is certain that the cause is not an organic lesion of the ear but on the contrary, a functional failure which may have various origins and notably a psychological cause.

It is not possible for the time being to give a more detailed explanation of the causes of the failure of a directive ear for in the present state of the art one can just prove experimentally this failure itself and the phonation disorders resulting therefrom.

With ths apparatus claimed in this case, it is possible to remedy this failure, which is of purely functional, not organic character.

According to the present invention, the method of conditioning the lateralization of the auditory state of a subject comprises, first, assigning to both ears of the subject—in the absence of an acoustic signal having an intensity higher than that of a predetermined threshold, a first auditory state, wherein both ears are subjected to the same auditive excitation, then, and upon appearance of an acoustic signal of an intensity higher than said threshold, switching both ears into a second auditory state, wherein one of the ears—viz. the directive ear—is subjected to the same auditive excitation as in the first auditory state, whilst the opposite ear is subjected to a relative attenuation with respect to the additive excitation of the directive ear, and, finally, restoring both ears in their auditory state upon disappearance of said signal.

According to an additional feature of the invention, the passage from the first auditory state to the second auditory state is periodically repeated as many times as required.

The acoustic signal which causes the passage of both ears from the first to the second auditory state may be emitted by an external source, or else, it may consist of the voice of the subject himself.

The timing of the passage from the first to the second auditory state may be adjusted at will.

It is also possible, in the second auditory state, to cause an additional delay of transmission to the ear, opposite said directive ear, so that said ear is subjected to the attenuated auditive excitation with a certain delay with respect to the instant when the directive ear is subjected to the normal auditive excitation.

It is another object of the invention to provide an apparatus for carrying into effect the auditory lateralization method as set forth hereinabove.

The auditive differentiation furnished by the method and device of the invention becomes rapidly unconscious for the subject. The method and apparatus may thus be advantageously applied to readjusting the disorders of the rhythm (stuttering, stammering), to a better and more concentrated sighting of the information, since the directive ear is restored to its primary function. This application is particularly interesting for children, since it enables in a higher degree, to fix the attention of the child treated for such disorders as dyslexia or dyspraxia (disorders of reading or writing).

The lateralization process may also be applied to ambidextrous individuals; in such particular cases, it is possible to cause the superposition of a directive ear at the right, rather than at the left.

With the foregoing and other objects in view, the invention resides in the novel arrangement and combination of parts, and in the details of construction and embodiment hereinafter described and claimed, it being understood that changes in the precise embodiments of the invention herein disclosed may be made within the scope of what is claimed without departing from the spirit of the invention. Other objects and advantages will become apparent from the following description taken in conjunction with the accompanying drawings in which:

FIGURE 1 is a diagram showing the principle of the apparatus of this invention;

FIGURES 2A to 2C are diagrams illustrating the operation of the apparatus;

The various component elements of the apparatus of this invention are shown in block form in FIG. 1, these blocks being also shown in the detailed diagram of FIG. 3 in which they are designated by the same reference numerals.

Figure 3:
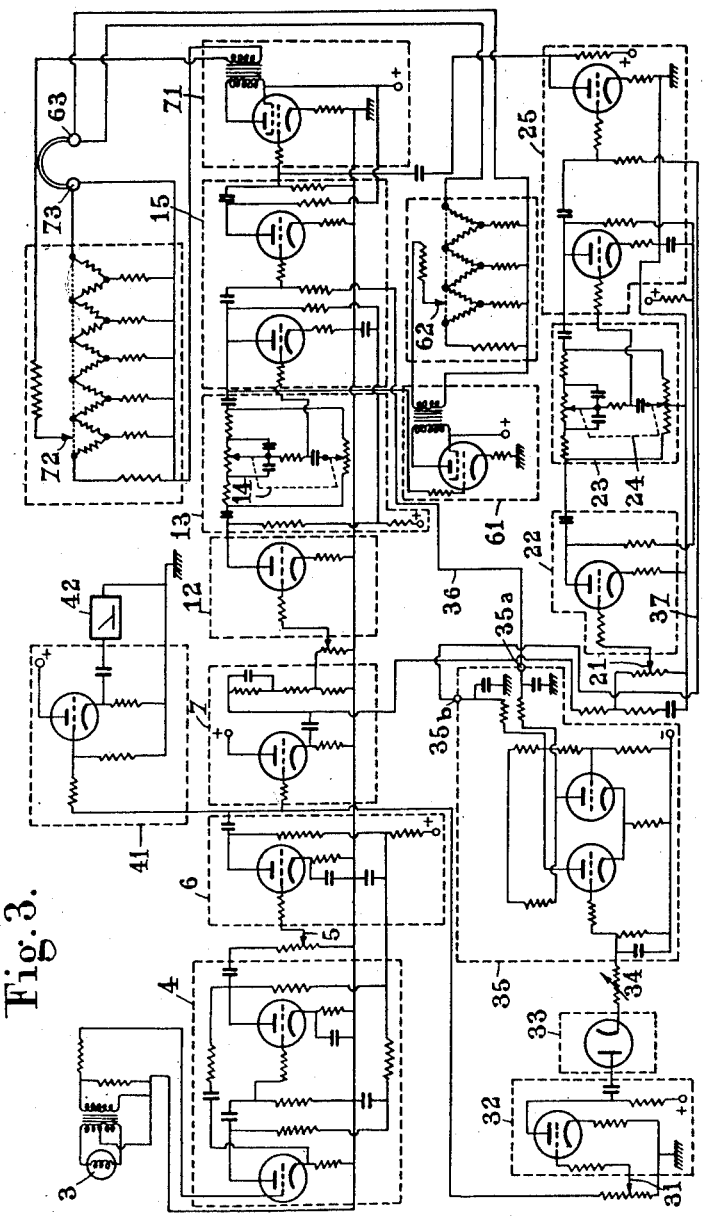
FIGURE 3 is a wiring diagram of a typical form of embodiment of the invention.

In FIG. 1 the apparatus is shown as comprising essentially an input stage 1, a first channel 10 and another channel 20 connected in parallel, and an auxiliary channel 30. Each one of these main elements is enclosed in dotted rectangles.

The input stage 1 comprises a microphone 3 receiving the acoustic signals, sounds or noise, emitted from an external source or from the subject him- or herself. This microphone is connected to a preamplifier 4 connected in turn to a general amplifier 6 through a device 5 for adjusting the sensitivity of the microphone.

The output of amplifier 6 is connected to an impedance-matching amplifier 7 having its output connected in parallel to the inputs of channels 10 and 20.

The first channel 10 comprises in succession a device 11 for adjusting the gain of this channel, an amplifier 12, a filter 13 of which the response curve is adjustable by means of a knob 14, and finally a gate 15. Similarly, the other channel 20 comprises a gain adjustment device 21, an amplifier 2, a filter 23 of which the response curve is adjustable by means of a button 24, and a gate 25.

At the outptu of filter 13 are connected in series an amplifier 61, a power regulating device 62 and an earphone 63. Elements 61, 62 and 63 constitute the first output stage of the sounds associated with the directive ear.

The second output stage includes an amplifier 71 connected at the output of gates 15 and 25, a power regulating device 72, an earphone 73 associated with the ear opposite the directive ear.

The auxiliary channel 30 has its input connected to the output of the general amplifier 6 of input stage 1. This auxiliary channel 30 comprises in succession a device 31 for adjusting the flip-flop release level, an impedance adapting amplifier 32, a detector 33 and a device 34 for adjusting the time constant of the flip-flop 35 controlling the channels 10 and 20. The flip-flop 35 may be of any known type and this specific application consists of a monostable multivibrator of which the two outputs 35a and 35b are connected through conductors 36 and 37 respectively to the control inputs of gates 15 and 25 of channels 10 and 20.

Finally, the apparatus comprises accessorily a measuring circuit connected to the output of the general amplifier 6, this circuit comprising an adaptor amplifier 41 and a reference VU-meter 42.

The operation of the apparatus of this invention will now be described with specific reference to FIGS. 2A to 2C.

Assuming that in the initial state, that is, at time $t0$, the acoustic intensity of the input signal received by he microphone 3 is not sufficient to release the monostable multivibrator 35. This corresponds to a first auditory state $E_1$, the latter remaining from time $t0$ to time $t1$. FIG. 2A shows an acoustic signal 50 of rectangular shape, to indicate the noise or sound of which the intensity I is lower than the threshold $I_o$ necessary for releasing the monostable multivibrator, this threshold being shown in the form of a dotted line at 51. The threshold of release of the monostable multivibrator 35 is determined by the device 31 for adjusting the level of the monostable multivibrator in combination with the detector 32. Therefore, by acting upon the device 31 it is possible to shift the threshold for which the multivibrator is released.

In this preliminary state corresponding to the first auditory state the multivibrator 35 is in its inoperative position. In this position the output 35a connected to wire 36 has for example a positive voltage V2 (see FIG. 2B) which opens the gate 15, the other gate being closed by the voltage V1, inferior to V2 (see FIG. 2C), at which the output 35b connected to wire 37 has been brought.

Under these conditions, the first channel 10 is released whereas on the contrary the other channel 20 is locked.

Thus, as long as the acoustic signals received are lower than the triggering threshold, they are transmitted via channel 10 and modified in accordance with the response curve of filter 13, in view of being transmitted, at the output of the latter, both to the first and to the second ouput stages.

In this first auditory state, the directive ear and the opposite ear are subjected to the same auditive excitation, the first through circuit 61, 62, 63, and the second through circuit 15, 71, 72, 73.

The first state E1 is maintained up to the time $t1$ where an acoustic signal 52 appears which is shown in the form of a rectangular signal the intensity of which exceeds the threshold of release $I_o$ of the monostable multivibrator 35. The signal may for example be emitted by the subject in the microphone 3. At the time $t1$, the detector 33 of the auxiliary channel 30 permits the passage of a launching signal transmitted (through the device 34 for adjusting the time constant) to the multivibrator 35. The latter is thus triggered and moves to its operative state after a time T1 determined by the device 34 for adjusting the time constant. As a result, the control voltages applied to conductors 36 and 37 vary as indicated by the relevant curves of FIGS. 2B and 2C. Therefore, it will be seen that after a time lapse T1 the gate 25 is fully open due to the voltage V2 applied to the input thereof, whilst on the contrary the gate 15 is fully closed due to the voltage V1. From this moment on the second channel 20 is released whereas the first channel is locked.

Under these conditions, which correspond to the second auditory state E2, the directive ear to which corresponds the earphone 63 receives always the same auditive excitation transmitted thereto through filter 13 in the first channel and then through elements 61, 62 and earphone 63. On the other hand, the ear opposite to the directive ear, associated with earphone 73, receives an auditive excitation which is attenuated with respect to that of the directive ear. In effect, the auditive excitation is transmitted to the opposite ear through the second channel 20 and, particularly, via the second channel 20, through filter 23, the response curve of which is conveniently selected to present a general attenuation with respect to the response curve of filter 13. It follows that, in the second auditory state, the auditive excitation imposed to the opposite ear is clearly lower than that assigned to the directive ear. The latter is thus restored in its primary function, this function being of predominant and essential importance in the process of phonation.

At the time $t3$, when the acoustic signal 52 disappears, the multivibrator 35 resumes its inoperative state in a time lapse T2 which is definitely shorter than T1. This switching in the reverse direction involves another release of channel 10 attended by a locking of channel 20, so that the subject's ear is restored to the first auditory state.

The passage from state E1 to state E2 takes place when the subject speaks, periodically, each time a vowel is pronounced.

By properly setting the device 34 for adjusting the time constant of the monostable multivibrator 35 it is possible to vary the time T1 necessary for the multivibrator 35 to pass from its inoperative state to its operative state.

According to an alternative embodiment of the invention, an additional delay may be introduced, on switching over the second auditory state, in the transmission of the auditive excitation to the opposite ear. In this case, a simple delay device may be provided conveniently in the second channel 20, this device assuring the required transmission delay. This arrangement enables to furnish the subject with the notion of space volume.

According to a modified embodiment of this apparatus, means such as an inverter controlled either manually by the operator or by the subject him- or herself may be substituted for the channel controlling automatically the actuation of the monostable multivibrator, for causing the latter to switch from one state to another and thus control the change in the auditory state.

It is to be understood that the embodiment described and illustrated hereinabove is only indicative and in no way limitative, since many modifications and variations may be carried out without departing from the scope and spirit of the invention.

What I claim is:

1. An apparatus for restoring the correct operation of a failing directive ear of a subject comprising an input stage for converting acoustic signals into electric signals, a first and a second output stage for converting the electric signals into acoustic signals, each of these output stages being associated to one of the ears of the subject, a first and a second channel connected in parallel between the input stage and the output stages, each of these channels comprising a filter and a gate controlling the opening and the closing thereof, the filter of the second channel determining an attenuation of the signals transmitted relating to the signals transmitted by the filter of the first channel, the input of the first output stage, associated with the directive ear of the subject, being connected to the output of the filter of the first channel, before the gate of said channel, whereas the input of the second output stage, associated to the ear opposite the directive ear, is connected to both outputs of the two channels, the apparatus comprising, in addition, an auxiliary channel connected to the output of the input stage, said auxiliary channel comprising triggering means for producing two control voltages applied, respectively, to the gates of the first and of the second channel, these control voltages being selected in such a manner that, in the absence of an acoustic signal of an intensity higher than a predetermined threshold, the first channel is the only one unblocked, so that both ears of the subject are subjected to the same auditive excitation transmitted through the filter of the first channel, and, upon the application of an acoustic signal, of an intensity higher than said threshold, to the input stage, the first channel is blocked while the second channel is unblocked, so that the auditive excitation of the opposite ear is attenuated, since the output stage associated therewith is then series conneced with the filter in the second channel.

2. An apparatus according to claim 1, wherein said last-named means comprise a monostable multivibrator and means are provided to vary the triggering time of said triggering means.

3. An apparatus according to claim 1, wherein means are provided to adjust the triggering level of said triggering means.

4. An apparatus according to claim 1, wherein means are provided to vary separatedly the gain of each channel.

5. An apparatus according to claim 1, comprising a microphone in the input stage and means for adjusting the sensitivity of said microphone.

6. An apparatus according to claim 1, wherein indicating means are provided for measuring the level of the input signals.

References Cited in the file of this patent

UNITED STATES PATENTS 1,586,952    Knudsen et al. _____ June 1, 1926

FOREIGN PATENTS 1,195,239    France _____ May 19, 1959